UNITED STATES PATENT OFFICE.

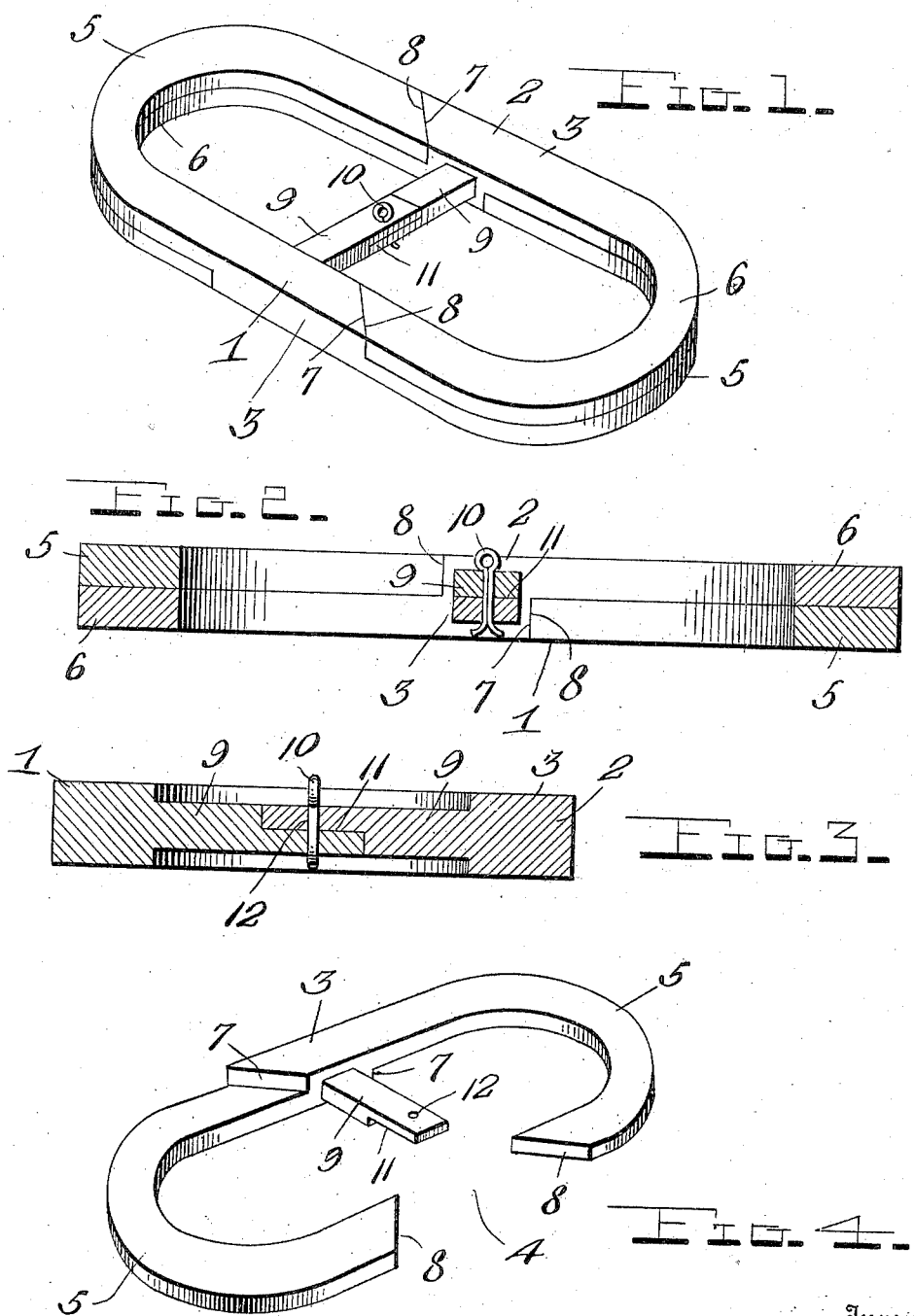

JOHN BAPTIST MENARD, OF BENTON, ARKANSAS.

LAP-LINK.

951,538.  Specification of Letters Patent.  Patented Mar. 8, 1910.

Application filed August 31, 1909. Serial No. 515,447.

*To all whom it may concern:*

Be it known that I, JOHN B. MENARD, a citizen of the United States, residing at Benton, in the county of Saline and State of Arkansas, have invented certain new and useful Improvements in Lap-Links, of which the following is a specification, reference being had to the accompanying drawings.

My invention relates to improvements in lap links and more particularly one especially adapted for repairing a broken chain or uniting the ends of one or more chains.

The object of the invention is to provide a simple and inexpensive device of this character composed of two similar sections which will have an effective interlocking connection, which when engaged and fastened will produce an exceedingly strong and durable link and which may be readily separated and fastened together.

With the above and other objects in view, the invention consists of the novel construction, combination and arrangements of parts, hereinafter fully described and claimed, and illustrated in the accompanying drawings in which—

Figure 1 is a perspective view of the improved link showing it in closed position. Figs. 2 and 3 are longitudinal and transverse sectional views. Fig. 4 is a perspective view of one of the two similar members or sections forming the link.

While the link may be of any desired shape and dimensions and constructed of any suitable material, the embodiment illustrated is of elongated circular or elliptical shape; and it is composed of two similarly shaped members or sections 1, 2. These two members are exact counterparts and each has a closed side 3 and an opening 4 in its opposite side. Each of said members has the opposite faces of its ends cut away or recessed to provide reduced U-shaped or hook-shaped ends 5, 6, which ends of one member are adapted to overlap or register with the corresponding ends of the other member and enter the recessed portions of the latter, as will be readily understood on reference to Figs. 1 and 2. By reducing the opposite faces of the ends 5, 6 inwardly inclined or angular shoulders 7 are formed on the closed side portion 3 of each member for engagement by the correspondingly beveled ends 8 of the hook portions 5, 6 on the coacting member, whereby an effective interlocking connection is provided. Such connection it will be noted will tend to maintain the two members in engaged position, and particularly when any load or strain is placed upon the opposite ends of the link. By reducing the opposite side faces of the ends 5, 6, and beveling or inclining the surfaces 7, 8, in an inward direction, it will be seen that the two link members or sections when moved into their interlocked position are placed upon each other in overlapping relation with their open sides turned inwardly, and they are then slid laterally across each other to bring the inclined surfaces 8 of one member into engagement with the inclined surfaces on the other, whereupon the two members register with each other and the outer flat side faces of the link will be smooth and unbroken.

While any suitable means may be provided for retaining the two members or sections 1, 2 in interlocked engagement, the same is preferably effected by providing upon the inner face of the closed side 3 of each of the members an inwardly or transversely extending arm 9 and passing a suitable fastening 10 through the overlapping inner portions of said arms. It will be noted that the arms 9 when engaged form a cross bar to reinforce it and strengthen the link and prevent the kinking of the chain in which the improved link is included. The overlapping inner ends of the two arms or cross bar members 9 are recessed as at 11 upon their opposite faces so that they fit into each other, and they are formed with registering openings 12 to receive the fastening 10. The latter may be of any desired form and construction but as illustrated consists of a split pin or key, the ends of which after being passed through the openings 12, are bent to retain the fastening in position.

Various changes in the form, proportion and arrangements of parts may be made within the spirit and scope of the invention.

Having thus described the invention what is claimed is:

The herein described lap link comprising two separable members each having a closed side, an open side and opposing hook-shaped ends, the opposite side faces of the ends of each member being recessed to receive the remaining portions of the opposite ends of the co-acting member, the recessing of said side faces of the two members forming on the closed sides of the same the inwardly inclined shoulders 7, the extremities 8 of the hook-shaped ends of the members being correspondingly inclined to engage said shoulders, whereby the two members will be interlocked in overlapping relation when the members are placed upon each other with their open sides turned inwardly and then slid laterally upon each other until the closed side of one registers with the open side of the other, an inwardly extending arm formed integral with the inner edge of the unreduced central portion of the closed side of each member, said arms having their inner ends correspondingly recessed on opposite sides to fit into each other in overlapping relation, the overlapped recessed portions of said arms being formed with registering openings, and a locking pin removably arranged in said openings to unite the arms and retain the members in interlocked position.

In testimony whereof I hereunto affix my signature in the presence of two witnesses.

JOHN BAPTIST MENARD.

Witnesses:
GEO. A. ZINN,
JAS. T. BARRON.